Dec. 27, 1932.  K. J. STRIGL  1,892,021
TRANSMISSION MECHANISM
Filed June 16, 1931   3 Sheets-Sheet 2
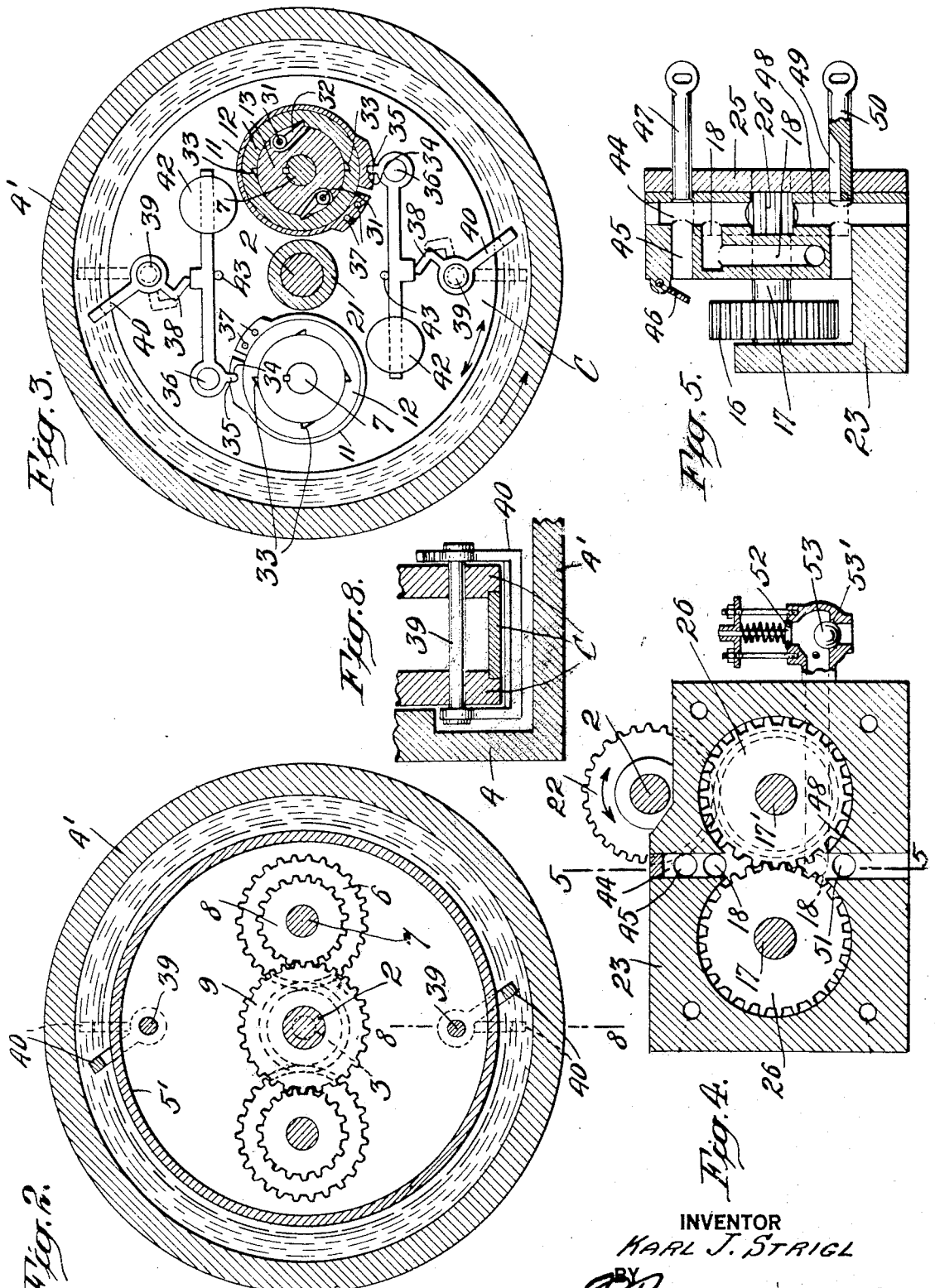
INVENTOR
KARL J. STRIGL
BY
ATTORNEY Dec. 27, 1932.    K. J. STRIGL    1,892,021
TRANSMISSION MECHANISM
Filed June 16, 1931    3 Sheets-Sheet 3

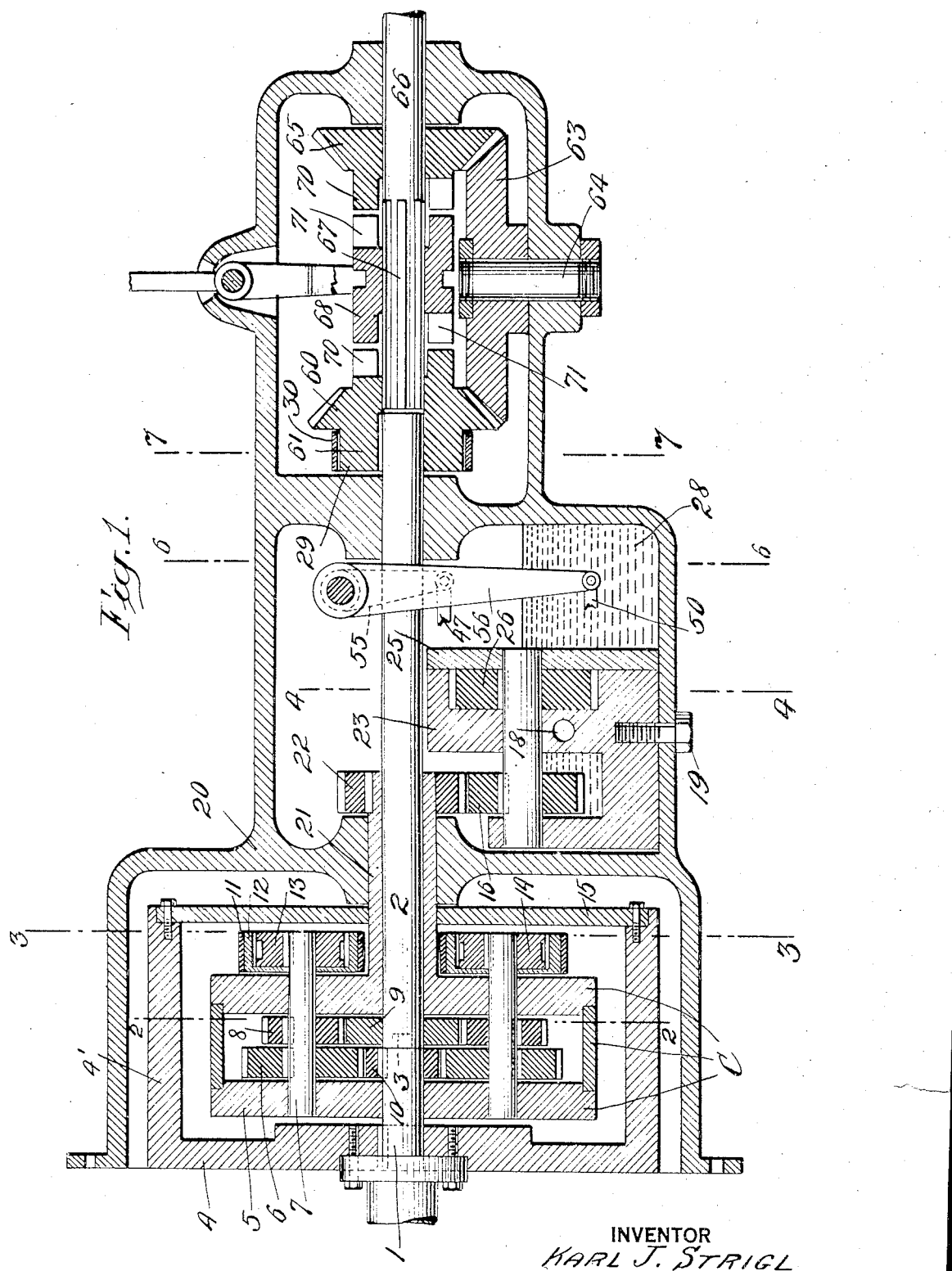

INVENTOR
KARL J. STRIGL
ATTORNEY

Patented Dec. 27, 1932

1,892,021

UNITED STATES PATENT OFFICE

KARL JOSEF STRIGL, OF NEW YORK, N. Y.

TRANSMISSION MECHANISM

Application filed June 16, 1931. Serial No. 544,726.

This invention relates to power transmission mechanism and consists of a novel transmission of improved design and structural arrangement adapted to successfully employ an improved principle of operation and possessing structural and operating advantages over present transmissions, particularly as employed for motor vehicle operation.

The general object is to provide an improved variable speed transmission mechanism adapted to be semi-automatic in action and to allow of eliminating the clutch as at present employed and the many manual operations necessary in standard automobile transmissions to operate a car from rest or stop into high gear or direct drive condition.

Further objects accomplished by my present invention are—to produce a transmission which in operation provides an automatically effected neutral under control of the motor for idling speed without additional action on the part of the operator, thereby insuring against accidental stalling of the motor; to provide a starting and low gear arrangement operable with a variable speed ratio while the driving torque remains constant thereby to allow starting with the motor operating at a relatively high speed ratio to the driven shaft, of say 100 to 1 or higher and which is progressively diminished under the control of the operator to a full low speed drive ratio of 2¼ to 1; to provide for such variable speed control by hydraulic acting means operable by the simple depression of the accelerator pedal; the provision of means operative automatically to effect a high gear or direct drive condition responsive to a slight release of the accelerator or gas pedal when the car has acquired a given speed and which will be operable reversely, automatically to change to low gear drive when the speed of the car becomes less than the given or set speed.

Therewith I preferably employ a free wheeling device in an improved relation and arrangement which provides for retarding of the car under the action of the hydraulic means on the driven shaft of the transmission, this action being controlled by the brake pedal and operable to give a substantial retarding effect or influence in advance of or conjointly with the action of the brakes, thereby materially adding to the safety factor in the car operation.

The foregoing and other important features and advantages of the present invention will be more fully understood by reference to the accompanying drawings wherein like reference characters are applied to the corresponding parts in the several views.

In the drawings:

Fig. 1 is a central, longitudinal, vertical sectional view of my improved transmission mechanism.

Fig. 2 is a transverse, vertical sectional view thereof taken on line 2—2 of Fig. 1.

Fig. 3 is a similar view taken on line 3—3 of Fig. 1.

Fig. 4 is a vertical, transverse, sectional view of the hydraulic controlling means or gear pump, taken on line 4—4 of Fig. 1.

Fig. 5 is a vertical, longitudinal, sectional view through the gear pump, taken on line 5—5 of Fig. 4.

Fig. 8 is a partial vertical, sectional view taken on line 8—8 of Fig. 2.

Figure 6:
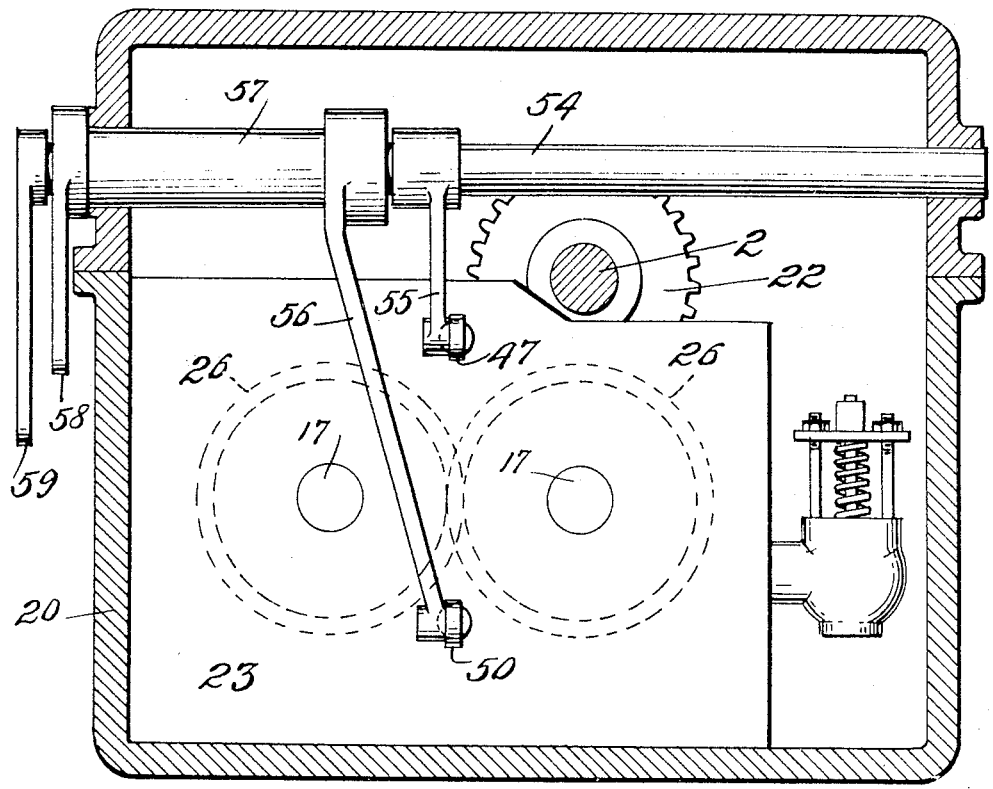
Fig. 6 is a vertical, transverse, sectional view taken on line 6—6 of Fig. 1.

In the approved embodiment of the features of my invention as here shown, 1 indicates the power or driving shaft which in the present disclosure is the crank shaft of an internal combustion motor of an automobile to be driven thereby. Suitably journalled in axial alignment with the power shaft 1 is a driven shaft 2, the forward end of which abuts the shaft 1 and is provided at 3 with an end socket bearing fitted to a trunnion bearing on the end of the shaft 1. The rear end of the driven shaft 2 is arranged to have driving connection with the wheels of the vehicle as hereinafter described. The motor crank shaft 1 has secured thereon, by means of a key and bolts as shown, an outer casing member 4 having an annular flange 4' which in conjunction with a rearward end closing plate 15, bolted thereto, forms an enclosing casing for a variable speed transmission mechanism now to be described. This outer casing, as will be understood, acts as a fly wheel for the motor.

The variable gearing mechanism within the casing comprises an inner casing or gear casing member c formed by oppositely positioned bearing discs 5—5 journalled upon the respective shafts 1 and 2 and connected by an annular member 5' to form the inner or gear casing. The variable speed gearing provided within the gear casing, so formed, is of the planetary type and includes planet gears 6 and 8 keyed upon the counter-shafts 7 journalled in the bearing discs 5 of the gear casing. As shown, oppositely positioned planet gearing is employed for balanced action in the customary manner. The planet gears are driven from the drive shaft 1 by means of a drive gear 10 keyed to the shaft 1 in mesh with the planet gears 6 and the latter are connected to drive the driven shaft 2 by means of a gear 9 keyed on the end of shaft 2 in mesh with the smaller planet gears 8.

Associated with each of the planet gears, provision is made, under determined conditions, to effect the locking of the gears against rotation to establish a direct drive condition between shafts 1 and 2 and likewise under the condition of the driven shaft rotating in advance of the drive shaft to allow of automatic free wheeling action. To this end the countershafts 7 are extended rearwardly from the casing and upon the ends of the countershafts are keyed disc members 13 surrounded by rotatable annular drums 12 which are in turn enclosed by brake bands 11 secured to the disc 5 by studs 37. The inner peripheral surface of the drums 12 are provided with notches 33 to be engaged for coupling in one direction by pivoted pawls 32 fitted within notches in the discs 13 and pivoted on pins 31 carried by said discs, as shown.

To control the action of the planetary gearing and for the further purposes as hereinafter described, the gear casing c is provided with a rearwardly extending bearing sleeve portion 21, integrally formed with the rearwardly positioned disc member 5. This sleeve 21 is journalled within a bearing of a transmission supporting and enclosing housing 20 and at its rearward end has keyed thereon a controlling gear 22 which in accordance with my invention is in mesh with a gear 16 of a hydraulic control means, preferably in the form of a rotary hydraulic or oil pump of the gear type, positioned within an oil reservoir 28 formed in the housing 20.

The hydraulic control means or gear pump, as shown, consists of a pump casing 23 providing bearings for and closely surrounding meshing rotors or gears 26—26' of the gear pump, the gears being mounted upon parallel shafts 17 and 17' journalled in the pump casing, as shown. The shaft 17, in addition to the pump gear 26, has keyed thereon a gear 16 in mesh with the control gear 22 of the transmission whereby it is connected to be rotated from the latter. The pump casing, as shown, is formed with upper and lower vertical channels or oil ducts 44 and 48 positioned centrally of the rotor gear openings and communicating therewith from above and below the meshing teeth which in the well known manner of the gear type pump provide the fluid or oil check. A horizontal channel 45 is formed to provide a discharge port for the upper channel 44 and is provided with a pivoted check valve 46. The lower pump channel 48 has communicating therewith a similar horizontal channel 51 opening into the oil reservoir. Also communicating with the upper pump channel 44 there is provided a by-pass channel 18 having its upper horizontal leg opening into the channel 44 and a lower leg provided with a pressure relief valve 52 and gravity ball intake valve 53 fitted to a valve seat 53'. The pump case is formed with upper and lower, horizontal slide bearings in axial alignment with the channels 45 and 51, to which are fitted valve slides 47 and 50, respectively, for manual control of the pump action. The upper valve slide 47 is operatively connected to the usual accelerator or gas control pedal for the motor by means of suitable connections including lever 55 keyed on a rock shaft 54, journalled in the housing, having affixed to its extended end a lever 59 to which the accelerator pedal is connected. Rotatably mounted on the rock shaft is a sleeve 57 having an external lever 58 to which the brake pedal is operatively connected and said sleeve is provided at its inner end with a lever 56 pivotally connected to the lower valve slide 50.

In accordance with a further feature of my invention there is incorporated with the planet gearing construction means operating automatically to lock the countershafts 7 by means of the brake bands 11, hereinbefore referred to, to establish the direct drive condition. The means provided is operative automatically to constrict the brake bands 11 upon the drums 12, responsive to the rotary speed of the gear casing c and further means are provided to automatically prevent locking of the brakes under certain desired conditions of relative rotation of the parts. To this end, the brake bands 11 are normally expansible to release the drums and the free ends thereof are notched at 34 to receive lever extensions 35 of centrifugally acting brake actuating bell crank levers 35 pivoted upon studs 36 on the disc 5 and provided upon their outer arms with adjustable weights 42 to govern their action. Stop pins 43 are provided on the discs 5 to limit the inward or brake release movement of the levers 35. Normally, under centrifugal action, the brake actuating levers will operate to tighten the brake bands upon the drums and through the action of the pawls 32 effect locking of the countershafts and planet gears against rotation in one direction, which is in the direction to effect direct drive from the motor to the driven shaft.

The means to prevent the foregoing locking action under conditions of certain relative rotation of the gear casing and the fly wheel casing 4, consists in the provision of pivotally supported stops 38, as best shown in Figs. 3 and 8. The stops 38 are positioned to be movable into the path of the lever 35 to be engaged by the latter when the stops are in inner position, thereby to prevent the tightening of the brake bands, as will be readily understood. For automatically operating the stops 38, they are pivotally supported upon pins 39 extending through the gear casing and the stops are integrally formed with a paddle or blade extension 40 positioned to be movable within the annular space between the outer and inner peripheries of the gear casing $c$ and fly wheel casing 4 respectively and this space is filled with oil whereby the stop will be movable responsive to the direction of movement of the oil ring established under centrifugal or rotary action. As shown, the blades 40 are extended fully over the gear casing to obtain bearings upon opposite sides thereof (Fig. 8); the movement in either direction being limited by contact with the casing 5.

Figure 7:
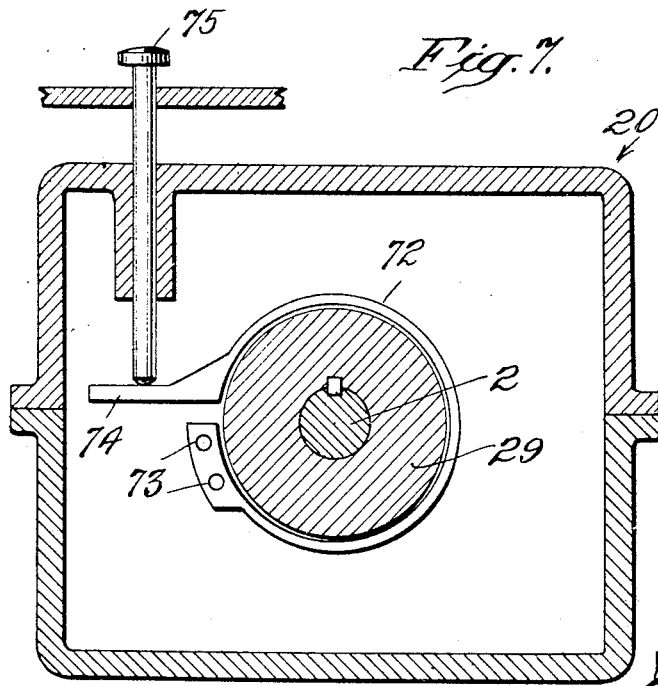
Fig. 7 is a similar view taken on line 7—7 of Fig. 1.

To provide for reversely driving of the vehicle there is provided a special manually controlled gear shift arrangement which may desirably be formed to provide an additional manually controlled neutral as an added precaution under parking conditions. As here shown, this gear shift provision is arranged at the rear of the housing 20 and consists of a bevel gear 60 keyed upon the rearward end of the driven shaft 2 and formed with an annular braking hub extension 61. The gear 60 meshes with a horizontally positioned bevel gear 63 rotatable upon vertical shaft 64 supported on the housing and meshing at its opposite side with a bevel gear 65 journalled upon a wheel driving shaft 66 journalled in the housing in alignment with the driven shaft 2 and provided with elongated, longitudinally extending keyways 67 to which a shiftable coupling member 68 is keyed. The gears 60 and 65 are formed with opposed coupling jaws 70 to be engaged by co-acting jaws 71 on the coupling member upon shifting of the latter forwardly or rearwardly from the neutral position as shown. The coupling member is connected to a manually operated shift lever whereby upon being shifted forwardly into engagement with the gear 60 it will effect direct coupling engagement between shafts 2 and 66 for forward drive, at which time gears 63 and 65 will rotate idly. Upon shifting of the coupling member rearwardly it will effect coupling engagement between gear 65 and shaft 66 whereby the latter will be rotated reversely from the shaft 2 through the intermediate gear 63 as is readily understood. For assistance in starting of the motor when the coupling member 68 is in neutral position, there is provided a manually operated brake band 72 secured to the housing by studs 73 as best shown in Figs. 1 and 7. The brake band 72 is normally expansible and its free end is provided with the shoulder 74 positioned to be engaged by a treadle pin 75 to constrict the band into braking engagement with the drum or hub extension 61 of gear 60 to apply braking action to the driven shaft.

*Operation.*—Starting of the motor when cold may desirably be effected with the reverse gear coupling 67 in neutral position. When sufficiently warmed, the coupling may be shifted to driving connection, either forward or reverse, in a noiseless way by depressing the treadle pin 75 thereby actuating the brake 72 to hold the driven shaft 2 from rotation while the desired shift is made. If the motor is warm it can be started with the manual coupling 67 in position for either forward or reverse drive as the improved transmission mechanism is normally in neutral upon release of the accelerator pedal. This automatic neutral is attained, with the motor rotating at idling speed, under the condition that the driving shaft 1, gear 10 and fly wheel casing 4 rotate in a counter clockwise direction (all rotations as specified are as viewed from the rear) while the driven shaft 2, gear 9 and wheel driving connections do not rotate by reason of the load resistance. The gear casing 5 carrying the planet gears develops less resistance than the driving connections and inertia of the car and in consequence the casing will at this time be forced to rotate in a clockwise direction, owing to the different diameters of the gears 10, 6, 8 and 9. The sleeve 21, control gear 22 and the pump gears are rotated with the gear casing $c$; the pump shaft 17 rotating in a counter clockwise direction whereby the suction on the gear pump is through the channels 51 and 48 and the discharge is through channels 44, 45 and through the check valve 46. There is under this neutral condition a free passage of the oil with no resistance from the controlling pump to resist the planetary action of the gears as described. Likewise, at this time the fly wheel casing 4 and the gear casing $c$ rotate in opposite directions, as indicated by the arrows, causing the stops 38 to assume the position to prevent braking action on the countershafts 7 by the centrifugally acting levers 35 so that neutral or non-driving action is maintained.

The change from the automatic neutral to driving condition in low or second gear is accomplished by merely pressing slowly down on the accelerator or gas pedal. As described, the gas pedal is connected to the valve slide 47 of the gear pump. Depression of the gas pedal accordingly gradually closes the pump channel 44 thereby progressively checking the rotation of the pump rotors or gears 26—26 and likewise the rotation of the gear casing $c$ until a full stop thereof is established. As the automatic brakes are still blocked by movable stops 38, a full second gear driving condition exists to drive the driven shaft 2 at a speed ratio of two and a quarter to one of the driving shaft 1. In this operation, the travel distance of the slide-valve 47 is adjusted to allow the motor to be stepped up to a relatively high rate of speed before the discharge 44 and 45 is closed thereby giving a motor acceleration as the gear casing $c$ is gradually checked or retarded. This gradual retarding of the gear casing as will be readily understood results in the starting of the vehicle with the motor operating at a relatively high speed ratio to the rotation of the driven shaft which is progressively diminished until the full low speed driving ratio is effected. The pump relief valve 52 is tensioned to relieve excessive pressures in the event that the accelerator pedal is pressed down too suddenly thereby avoiding excessive strains on the gears and driving connections as will be readily appreciated.

After the car is speeded up to a rate of speed determined by the centrifugal action of the brake setting levers 35, a change into high gear or direct drive condition is effected by momentarily releasing the gas pedal sufficient to allow the driven parts to rotate in advance relation to the motor and again depressing the accelerator pedal. Responsive to the first action of releasing the gas pedal the rotation of the motor decreases while the car and driving connections including the driven shaft 2 continue in momentum; the gear casing $c$ takes up the speed of the driven shaft 2 and accordingly rotates the pump in opposite direction as in neutral. The suction is now through the check valve 53 and by-pass channel 18 with the check valve 46 closed. Discharge is through the channels 48 and 51. Responsive to the same action, the changed relations in the transmission are as follows. As stated, the gear casing $c$ is caused to rotate in the direction of the driven shaft 2 at driven shaft speed or faster depending on the speed difference therebetween. This speed change between the motor fly wheel casing 4 and casing 5 through the influence of the oil ring therebetween, plus inertia and centrifugal force, acting on the movable stops 40 moves the stops into the releasing position as shown in dotted lines in Fig. 3 allowing the centrifugal action of levers 35 to set the counter-shaft brakes 11 onto the drums 12 while the inner discs 13 and pawls still rotate in counterclockwise direction with free wheeling action. The brakes are thus set without friction on the drums.

Upon the subsequent action of again depressing the accelerator pedal the motor is speeded up and the gear casing $c$ is again driven from the drive shaft 1 with the tendency to rotate in the opposite direction. This tendency is now resisted by the action of the clutch pawls 32 engaging the notches of the now braked drums 12. The latter is effected by centrifugal action of the pawls within a quarter revolution in the clockwise direction. The transmission is now in direct drive as the counter-shafts are held against rotation and the gear pump rotates with the discharge wide open and the oil passes through freely.

The reverse change from high gear to low gear drive is automatic in its action without manual effort on the part of the operator. When the load retards the rotations of the drive shaft or motor down to the speed determined by the action of the centrifugally operating levers 35 the brakes 11 will be allowed to expand whereby the casing $c$ will cease to rotate with the driving shaft and tends to rotate in counter clockwise direction, which is prevented as long as the gas pedal is pressed down and the discharge 44—45—46 of the pump closed. The car is accordingly again in second or low speed driving condition.

When driving down grade and it is desired to check the speed of the car, the gas pedal is released reducing the speed of the motor while the driven shaft rotates in accordance with the speed of the car. The brake pedal is now partly depressed operating through connection 56 to close pump slide valve 50 thereby retarding the rotation of the pump rotors and all parts driving the pump as the result of which the car is retarded by braking action through the transmission parts. The valve slide 50 as shown is formed with a longitudinal groove 49 to prevent full closing thereof to avoid too severe braking action. To bring the car to a total stop, the brake pedal is further depressed causing the usual brakes on the wheels to be applied without choking discharge 51 further. The improved arrangement accordingly provides with a free wheeling transmission hydraulic control to retard the car speed acting through the driven shaft and operable by simply depressing of the brake pedal to retard the car in advance of and conjointly with the action of the brakes.

As will be readily understood, when the accelerator pedal is released, pump discharge 44—45—46 is again opened and the drive changes automatically to neutral as soon as the speed of the driven shaft decreases to below the centrifugal setting of the levers 35. The fluid to be used in the gear pump compartment 28 and in the fly wheel may desirably be glycerine or refrigerator oil with a low freeing point or other suitable fluid or oil.

While I have shown and described an approved embodiment of the features of the present invention, it will be understood that varied modifications may be made therein without departing from the scope thereof as defined in the appended claims. Also while I have shown the several important features of the present invention in co-acting and co-related use it will be apparent that they are capable of use independently of other features as shown. For instance, and as will be readily appreciated, my improved hydraulic control means for a planetary type transmission may be employed without provision of automatic shift to high or direct drive or for free wheeling as herein embodied. Likewise the improved hydraulic retarding means acting through the driven connections, particularly in its association with the free wheeling clutch, may advantageously be employed with other types of variable speed gearing constructions. It is therefore intended that all matter herein shall be interpreted as illustrative and not in a limiting sense.

Having described my invention, I claim:

1. Power transmission mechanism comprising a motor, a driving shaft and a driven shaft, reducing variable speed, planetary gearing means between said shafts, a rotary fluid pump rotatably connected to the gearing means to control the action thereof, valve means adapted to progressively control the speed ratio of the gearing by controlling the fluid passage through the pump and manually operated means adapted simultaneously to control the action of the motor and the valve means and means to establish direct driving relation between the driving and driven shafts.

2. Power transmission mechanism comprising a motor, a driving shaft and a driven shaft, variable speed planetary gearing means between said shafts, a rotary fluid pump rotatably connected to the gearing means to control the action of the latter and operable in reverse directions, valves positioned to control the passage of the fluid through the pump in each direction, operating connections to one of said valves from the motor accelerator and operating connections to the other of said valves from a brake actuating means, substantially as described.

3. Power transmission mechanism comprising a driving shaft and a driven shaft, an outer casing member secured to the drive shaft, an inner casing member journalled within the outer casing with an annular fluid space therebetween, a gear on the drive shaft, a gear on the driven shaft, a counter-shaft carried by the inner casing and planetating gears on said countershaft engaging the drive and driven shaft gears, centrifugally active means associated with the counter-shaft to effect locking of the planet gears and controlling means for the centrifugal means consisting of a movable member pivotally supported on the inner casing and provided with a blade extension into the annular space to be actuated by the fluid, substantially as described.

4. A transmission mechanism comprising a driving shaft and a driven shaft in axial alignment, a gear on the drive shaft, a gear on the driven shaft, a rotatable gear casing, a counter-shaft carried by the casing, planet gears on the counter-shaft meshing with said drive and driven shaft gears, a disc keyed to the counter-shaft, a drum member rotatably mounted to surround the disc, coupling means interposed between the disc and drum and operative to couple said parts in one direction of relative rotation only, a brake band surrounding the drum and centrifugally acting means adapted to set the brakes, substantially as described.

5. A transmission mechanism consisting of a driving shaft, a driven shaft, a gear on the driving shaft, a gear on the driven shaft, a rotatable gear casing, a counter-shaft carried by the casing, planet gears on the counter-shaft meshing with said drive and driven shaft gears, a disc keyed to the counter-shaft, a drum surrounding the disc and formed with notches in its inner periphery, pawls pivotally mounted on the disc to engage said notches for coupling in one direction, a brake band secured on the casing to surround said drum and centrifugally acting levers connected to the bands for setting of the brakes under centrifugal action.

6. A power transmission comprising a double planetating gear system consisting of a drive shaft, a driven shaft, gears on said shafts, a journalled casing and planetating gears carried by said casing in mesh with the drive and driven shaft gears, said casing being rotatable in one direction when driven from the drive shaft and in the reverse direction when driven from the driven shaft and a rotary fluid pump rotatably connected to said casing to be rotated therewith in either direction, manually operable means to control the passage of the fluid through the pump in either direction and adapted to fully check the pump action in one direction of rotation, substantially as described.

7. A transmission mechanism comprising a driving shaft, a driven shaft in alignment therewith, a gear on the drive shaft, a gear on the driven shaft, a rotatable gear casing, a counter-shaft carried by the casing, planet gears on the counter-shaft meshing with said drive and driven shaft gears, a brake drum rotatively connected with the planet gears, a brake band surrounding the drum and centrifugally acting means adapted to set the brake consisting of a lever pivotally supported on the gear casing and provided with an inwardly directed arm engaging the brake band and an outer weighted arm extended substantially horizontally to set the brake under centrifugal action.

8. A transmission mechanism comprising a driving shaft and a driven shaft in axial alignment, a gear on the drive shaft, a gear on the driven shaft, a rotatable gear casing, a counter-shaft carried by the casing, planet gears on the counter-shaft meshing with said drive and driven shaft gears, a rotary fluid pump rotatably connected to said gear casing and manually operated valve means to control the fluid passage through said pump in one direction, said pump being formed with a by-pass to allow passage of the fluid in the opposite direction, and centrifugally acting means effective to lock the planet gears against rotation to establish a direct drive condition.

9. A transmission mechanism comprising a drive shaft and a driven shaft, variable speed planetary gearing means between said shafts, a rotary fluid pump rotatably connected to the gearing means to control the action of the latter, said pump being formed with intake and discharge channels at opposite sides, rotors controlling the fluid passage therethrough, a manually operable valve to control the fluid discharge and said pump being formed with a by-pass channel provided with a check valve to permit reverse passage of the fluid when the manually operable valve is closed, substantially as described.

10. A transmission mechanism comprising a drive shaft and a driven shaft, variable speed planetary gearing means between said shafts, a rotary fluid pump rotatably connected to the gearing means to control the action of the latter, said pump being formed with intake and discharge channels at opposite sides, rotors controlling the fluid passage therethrough, manually operable valve means to control the passage of the fluid through the discharge passage, said pump being formed with a by-pass channel provided with a check valve to permit reverse passage of the fluid when the manually operable valve is closed and a manually operable valve to check the discharge of the fluid in said reverse direction.

11. A transmission mechanism comprising a driving shaft and a driven shaft in axial alignment, a gear on the drive shaft, a gear on the driven shaft, a rotatable gear casing, a counter-shaft carried by the casing, planet gears on the counter-shaft meshing with said drive and driven shaft gears, a rotary fluid pump rotatably connected to said gear casing to control the rotation thereof, said pump being formed with intake and discharge channels, rotors controlling the fluid passage therethrough, a slide valve positioned to control the passage of the fluid through the discharge channel, manually operable means to actuate said valve to check the rotation of the gear casing, said pump being formed with a by-pass channel provided with a check-valve to permit reverse passage of the fluid when said valve is closed and a manually operable slide valve positioned to check the discharge of the fluid in said reverse direction, said latter valve being formed with a restricted passage to prevent full closing thereof.

12. A transmission mechanism as claimed in claim 11 provided with centrifugally acting locking means effective to lock the planet gears from rotation to establish a direct drive condition with the pump operating in said reverse direction.

13. A transmission mechanism comprising a motor, a driving shaft and a driven shaft, variable speed, planetary and reducing gearing means between said shafts, a rotary fluid pump connected to the gearing means to control the action of the latter, a valve to control the fluid passage through the pump, manually operating means connected to simultaneously control the valve and the motor and means to effect locking of the gearing means to establish direct drive condition responsive to release and subsequent advance of the manual operating means.

Signed at New York city, in the county of New York and State of New York this 15th day of June, A. D. 1931.

KARL JOSEF STRIGL.